US009116239B1

(12) United States Patent
Billsberry et al.

(10) Patent No.: US 9,116,239 B1
(45) Date of Patent: Aug. 25, 2015

(54) LOW RANGE ALTIMETER ANTENNA (71) Applicants: Mark A. Billsberry, Indialantic, FL (US); Howard D. Tetrault, Melbourne, FL (US)

(72) Inventors: Mark A. Billsberry, Indialantic, FL (US); Howard D. Tetrault, Melbourne, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 287 days.

(21) Appl. No.: 13/740,660

(22) Filed: Jan. 14, 2013

(51) Int. Cl.
*H01Q 1/28* (2006.01)
*G01S 13/88* (2006.01)
*G01S 13/91* (2006.01)

(52) U.S. Cl.
CPC ............. *G01S 13/913* (2013.01); *G01S 13/882* (2013.01); *H01Q 1/28* (2013.01)

(58) Field of Classification Search
CPC ......... G01S 13/08; G01S 13/36; G01S 13/60; G01S 13/882; H01Q 1/28; H01Q 1/282; H01Q 1/283
USPC ................ 343/705, 708, 711–713, 753, 755, 343/781 R, 833, 834–837, 872, 912; 342/29–51, 118, 120–122, 175
See application file for complete search history.

(56) References Cited

U.S. PATENT DOCUMENTS

| | | | | | |
|---|---|---|---|---|---|
| 2,686,302 | A | * | 8/1954 | Capelli | 342/122 |
| 3,604,006 | A | * | 9/1971 | Rogers | 343/705 |
| 3,753,134 | A | * | 8/1973 | Unterberger | 324/337 |
| 4,106,017 | A | * | 8/1978 | Roeder et al. | 342/88 |
| 4,336,543 | A | * | 6/1982 | Ganz et al. | 343/705 |
| 4,380,012 | A | * | 4/1983 | Bevan et al. | 343/705 |
| 4,489,328 | A | * | 12/1984 | Gears | 343/700 MS |
| 4,509,053 | A | * | 4/1985 | Robin et al. | 343/708 |
| 4,594,676 | A | * | 6/1986 | Breiholz et al. | 702/143 |
| 4,922,255 | A | * | 5/1990 | Berglind | 342/104 |
| 5,047,779 | A | * | 9/1991 | Hager | 342/120 |
| 5,049,891 | A | * | 9/1991 | Ettinger et al. | 343/705 |
| 5,072,223 | A | * | 12/1991 | Hethuin et al. | 342/122 |
| 5,151,707 | A | * | 9/1992 | Kumpfbeck et al. | 343/705 |
| 5,170,171 | A | * | 12/1992 | Brown | 342/191 |
| 5,184,141 | A | * | 2/1993 | Connolly et al. | 343/705 |
| 5,202,701 | A | * | 4/1993 | Casey | 343/909 |
| 5,220,335 | A | * | 6/1993 | Huang | 343/700 MS |
| H1219 | H | * | 8/1993 | Miller | 343/708 |
| 5,260,708 | A | * | 11/1993 | Auterman | 342/25 C |
| 5,355,139 | A | * | 10/1994 | Hirata et al. | 342/371 |
| 5,357,259 | A | * | 10/1994 | Nosal | 342/398 |
| 5,359,338 | A | * | 10/1994 | Hatcher et al. | 343/778 |
| 5,614,907 | A | * | 3/1997 | Kreitmair-Steck et al. | 342/25 F |
| 5,621,421 | A | * | 4/1997 | Kolz et al. | 343/892 |

(Continued)

*Primary Examiner* — Peter Bythrow
(74) *Attorney, Agent, or Firm* — Angel N. Gerdzhikov; Donna P. Suchy; Daniel M. Barbieri (57) ABSTRACT

The present disclosure is directed to low range altimeter (LRA) antenna implementations that are resistant to signal degradation under critical weather conditions. An altimeter may include a first antenna communicatively coupled to a transmitter configured to transmit a ranging signal to a surface. The altimeter may further include a second antenna communicatively coupled to a receiver configured to receive at least a portion of the ranging signal reflected from the surface. Each of the first (transmitting) antenna and the second (receiving) antenna may include a driven element and at least one parasitic director element. In some embodiments, at least a portion of an aircraft surface may function as a parasitic reflector element in accordance with a Yagi-Uda array antenna topology.

20 Claims, 8 Drawing Sheets

(56) References Cited

U.S. PATENT DOCUMENTS

| | | | |
|---|---|---|---|
| 5,657,032 A * | 8/1997 | Liechty et al. | 343/770 |
| 5,719,581 A * | 2/1998 | Poe | 342/120 |
| 5,719,582 A * | 2/1998 | Gray | 342/120 |
| 5,745,081 A * | 4/1998 | Brown et al. | 343/705 |
| 5,867,119 A * | 2/1999 | Corrubia et al. | 342/120 |
| 5,982,339 A * | 11/1999 | Lalezari et al. | 343/872 |
| 5,986,611 A * | 11/1999 | Harrison et al. | 343/705 |
| 6,229,491 B1 * | 5/2001 | Bolden et al. | 343/708 |
| 6,359,589 B1 * | 3/2002 | Bae | 343/700 MS |
| 6,768,469 B2 * | 7/2004 | Hager et al. | 343/770 |
| 7,151,504 B1 * | 12/2006 | Boatman et al. | 343/872 |
| 7,184,072 B1 * | 2/2007 | Loewen et al. | 348/144 |
| 7,382,330 B2 * | 6/2008 | Francque et al. | 343/835 |
| 7,589,683 B2 * | 9/2009 | McKivergan et al. | 343/708 |
| 7,633,451 B2 * | 12/2009 | Robin et al. | 343/705 |
| 8,248,298 B2 * | 8/2012 | Lalezari | 342/179 |
| 2003/0093187 A1 * | 5/2003 | Walker | 701/1 |
| 2004/0141170 A1 * | 7/2004 | Jamieson et al. | 356/5.01 |
| 2004/0145514 A1 * | 7/2004 | Raney | 342/120 |
| 2005/0128134 A1 * | 6/2005 | Shinoda et al. | 342/70 |
| 2009/0102705 A1 * | 4/2009 | Obermeyer | 342/25 F |
| 2010/0141527 A1 * | 6/2010 | Lalezari | 342/368 |
| 2012/0212366 A1 * | 8/2012 | Alalusi | 342/118 |
| 2013/0214964 A1 * | 8/2013 | Holt | 342/120 |
| 2014/0043197 A1 * | 2/2014 | Lee et al. | 343/833 |
| 2014/0361922 A1 * | 12/2014 | Duncan et al. | 342/25 F |

* cited by examiner

LOW RANGE ALTIMETER ANTENNA

TECHNICAL FIELD

The present disclosure generally relates to the field of antennas and more particularly to low range altimeter antennas.

BACKGROUND

Low range altimeters (LRAs) are used to determine altitude with respect to a surface, such as the ground or terrain beneath an aircraft. LRAs are typically used to aid guidance during approach and landing, especially during low-visibility conditions. In some instances, LRAs are further used as part of a ground proximity warning system (GPWS).

Instrument landing systems often rely on LRAs to aid guidance during approach and landing under critical weather conditions (e.g. very low visibility due to fog, rain, and/or snow). For example, LRAs may be used to provide flare guidance for flight control systems during a Category III C landing (i.e. approach and landing with no runway visual range limitations). Due to the risks involved, even short periods without information from the LRA are highly undesirable.

However, critical weather conditions can result in very significant amounts of water flowing along the underside of the aircraft fuselage where LRA antennas are typically disposed. The flow of water may be further exacerbated during final approach because the aircraft is typically oriented with its nose up during this stage of flight. Current LRA antenna implementations (e.g. narrow band patch antennas) are susceptible to significant signal degradation from heavy water flow. Accordingly, LRA functionality may be limited under critical weather conditions where signal strength and information accuracy are most needed.

SUMMARY

The present disclosure is directed to low range altimeter (LRA) antenna implementations that are resistant to signal degradation under critical weather conditions.

An embodiment of the present disclosure includes an altimeter. The altimeter may include a transmitter coupled to a first antenna configured for transmitting a ranging signal to a surface. The altimeter may further include a receiver coupled to a second antenna configured for receiving at least a portion of the ranging signal reflected from the surface. The altimeter may be configured to determine an altitude with respect to the surface utilizing information associated with the received portion of the reflected ranging signal. Each antenna may include a driven element and at least one parasitic director element.

In some embodiments, a first enclosure may be configured to contain the driven element and one or more director elements of the first antenna, and a second enclosure may be configured to contain the driven element and one or more director elements of the second antenna. Alternatively, a common enclosure may be configured to contain the driven element and one or more director elements of the first antenna and the driven element and one or more director elements of the second antenna. In some embodiments, at least a portion of an aircraft fuselage is enabled as a parasitic reflector element such that each antenna forms a Yagi-Uda array topology or the like when coupled or disposed proximate to a selected surface of an aircraft.

An embodiment of the present disclosure further includes a system for determining an altitude of an aircraft with respect to a surface, such as the ground or terrain beneath the aircraft. One or more portions of the altimeter may be disposed upon or within the aircraft. The altimeter may be configured to determine the altitude of the aircraft with respect to the surface utilizing information associated with the received portion of the ranging signal reflected from the surface. One or more enclosures containing the driven element and one or more director elements of each antenna may be coupled to an exterior surface of the aircraft, such as the underside of the aircraft fuselage, thereby forming a Yagi-Uda array topology or the like, wherein at least a portion of the aircraft fuselage is the reflector element of the Yagi-Uda array.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 1:
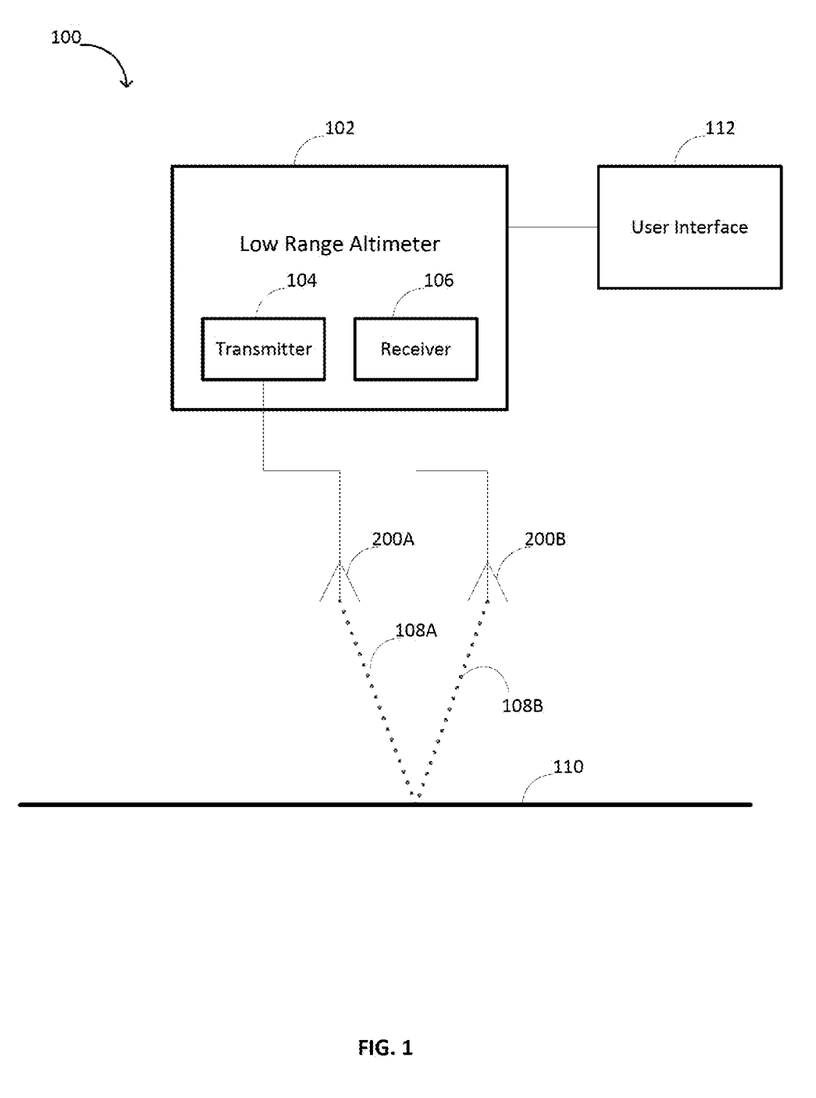
FIG. 1 is a block diagram illustrating a system for determining an altitude with respect to a surface, in accordance with an embodiment of this disclosure.

FIGS. 1 through 4C generally illustrate a system 100 for determining spatial relationship between a selected reference point and a surface 110. As illustrated in FIG. 1, the system 100 may include an altimeter 102 configured to determine an altitude of the selected reference point from a portion of the ground, terrain, or any other surface 110 located below the selected reference point. As used herein, the term "altimeter" generally refers to a low range altimeter (LRA), low range radio altimeter (LRRA), or any other radar/radio altimeter known to the art. The altimeter 102 may include hardware, software, and/or firmware configured to execute one or more of the functions or steps described herein. For example, the altimeter 102 may include at least one processor configured to execute program instructions from a carrier medium, such as a hard disk drive, solid-state disk, flash drive, optical disk, random access memory, and/or any other permanent or semi-permanent storage device.

In an embodiment, the altimeter 102 includes at least one transmitter 104 configured to transmit a ranging signal 108A utilizing at least one antenna 200A coupled to the transmitter 104. At least one surface 110 may receive the transmitted ranging signal 108A and reflect at least a portion 108B of the ranging signal 108A. The altimeter 102 may further include at least one receiver 106 configured to receive the reflected signal 108B utilizing at least one antenna 200B coupled to the receiver 106.

The altimeter 102 may be configured to determine an altitude with respect to the surface 110 utilizing information associated with the reflected signal 108B. For example, the altimeter 102 may be configured to determine the altitude of the selected reference point based on a time interval between transmitting the ranging signal 108A and receiving the reflected signal 108B.

In some embodiments, a user interface 112 communicatively coupled to the altimeter 102 may be configured for displaying altitude. The user interface 112 may include an LCD display, LED display, CRT monitor, or any other display device known to the art. In some embodiments, a flight control (i.e. auto-pilot) system is communicatively coupled to the altimeter and configured to receive information associated with altitude for aircraft guidance. Various implementations of the altimeter 102 are contemplated, and the present disclosure is intended to encompass any variations known to the art. Accordingly, the foregoing description of the altimeter 102 should not be interpreted as limiting the disclosure in any way.

Figure 2:
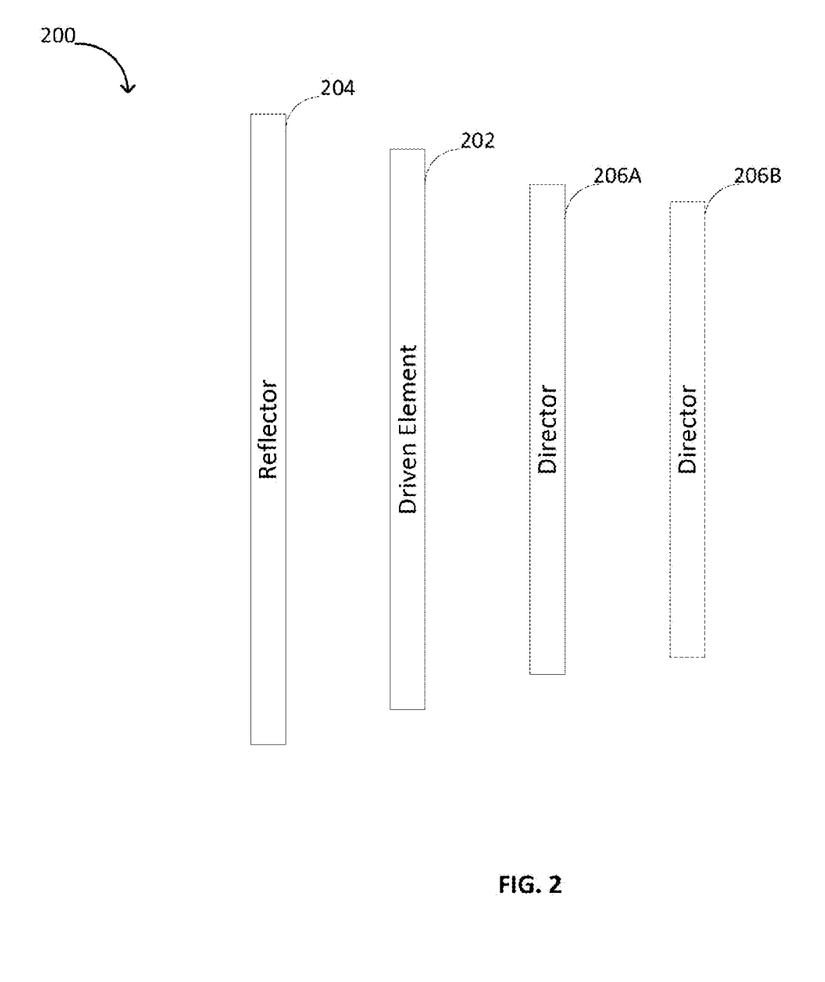
FIG. 2 is a block diagram illustrating the topology of a transmitting or receiving antenna of the system, in accordance with an embodiment of this disclosure.

As illustrated in FIG. 2, the transmitting and receiving antennas 200 may be designed in accordance with a Yagi-Uda array topology or the like. The directional gain associated with Yagi-Uda array topologies advantageously allows the altimeter antennas 200 to transmit and/or receive signals 108 with relatively high signal strength during critical weather conditions. Each antenna 200 may include a driven element 202, such as a single dipole, and one or more parasitic elements. In some embodiments, the parasitic elements include at least one reflector element 204 (typically longer than the driven element) and one or more director elements 206 (typically shorter than the driven element). In some embodiments, at least a portion of an aircraft fuselage functions as the reflector element 204. Accordingly, the antenna 200 may only require the driven element 202 and one or more director elements 206 to form a Yagi-Uda array topology when coupled or disposed proximate to a surface of an aircraft.

The transmitter 104 and receiver 106 may each be coupled to the driven element 202 of the respective transmitting or receiving antenna and configured to directly excite the driven element 202. Whereas, the parasitic elements may be configured to reradiate power received from the driven element 202. The element dimensions and spacings may be selected in response to desired signal transmission and/or reception characteristics. Any Yagi-Uda array or Yagi-antenna topology known to the art is contemplated herein. Accordingly, the foregoing general description is provided for illustrative purposes and should not be interpreted as limiting the disclosure in any way.

Figure 3A:
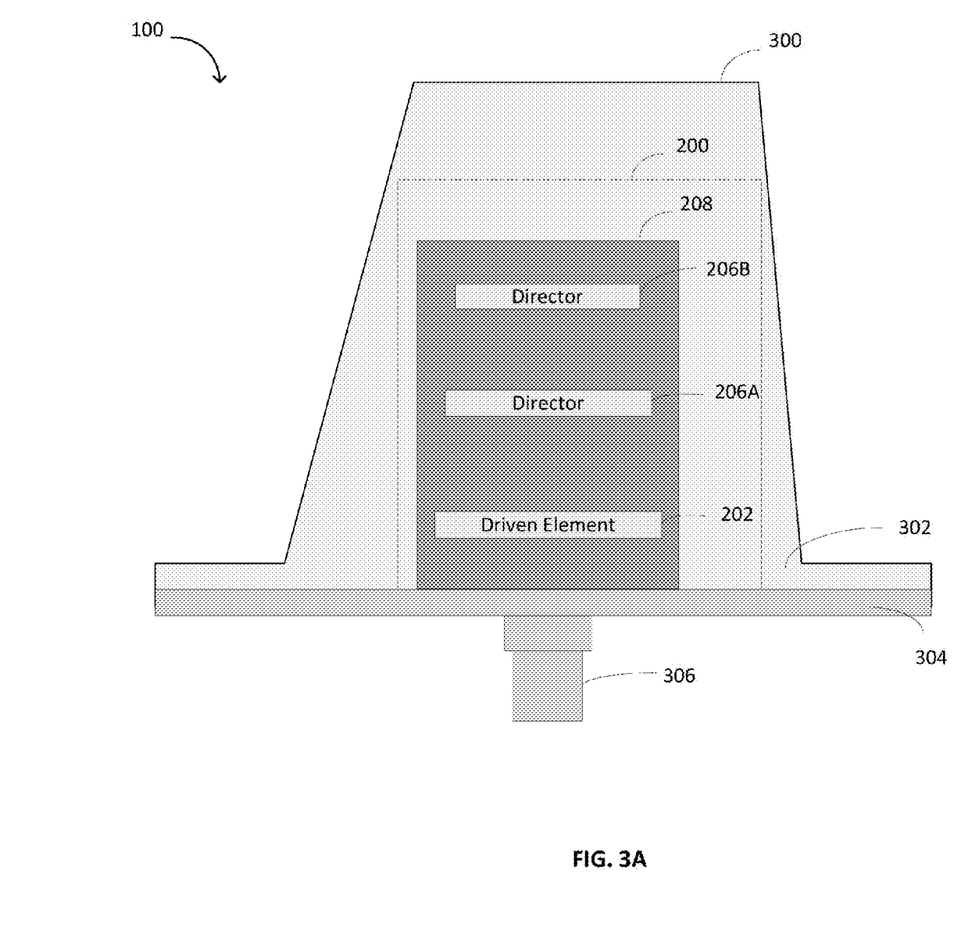
FIG. 3A conceptually illustrates an enclosure containing a driven element and at least one director element of a transmitting or receiving antenna of the system, in accordance with an embodiment of this disclosure.
Figure 3B:
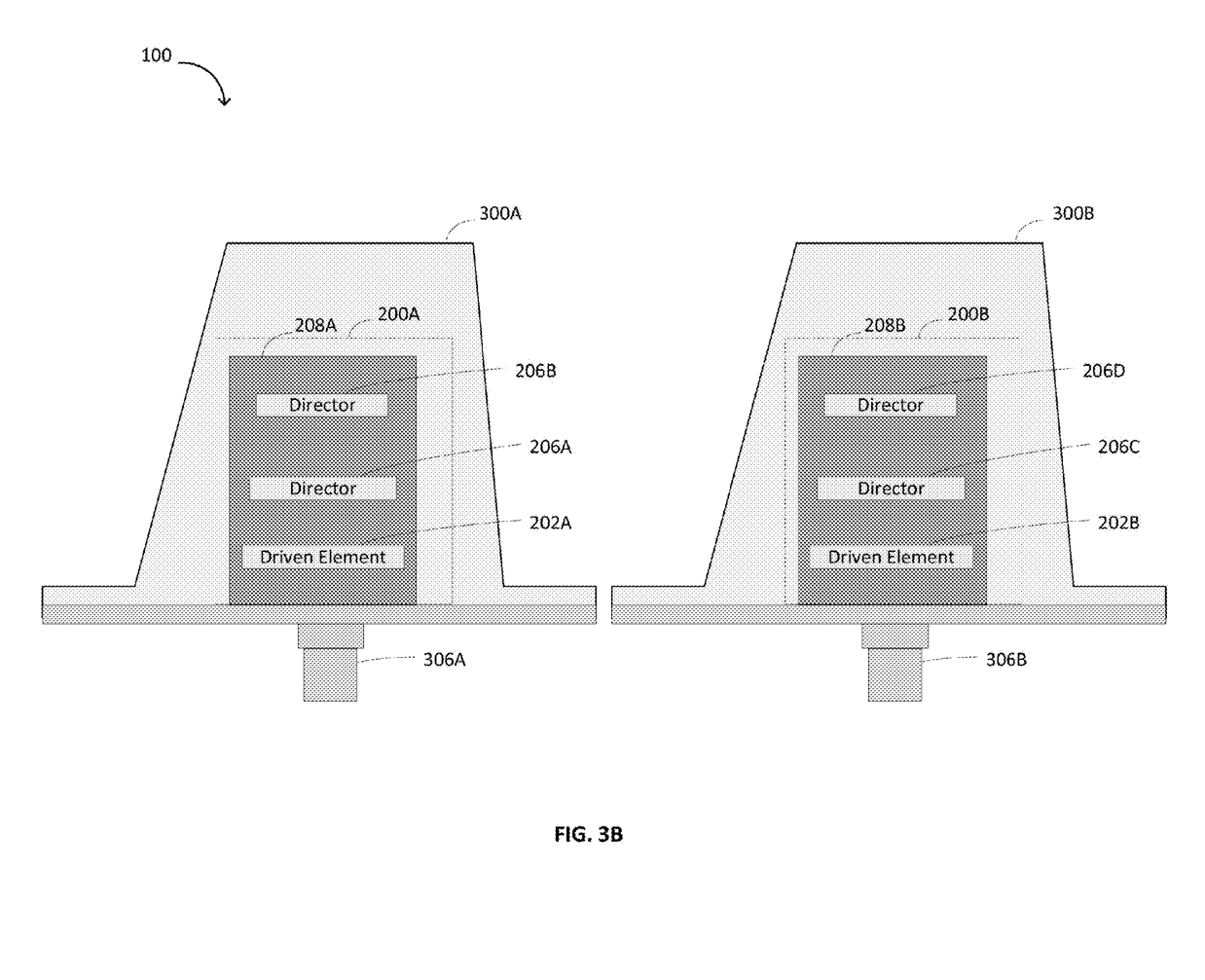
FIG. 3B conceptually illustrates a first enclosure containing a driven element and at least one director element of a first (transmitting) antenna of the system and a second enclosure containing a driven element and at least one director element of a second (receiving) antenna of the system, in accordance with an embodiment of this disclosure.
Figure 3C:
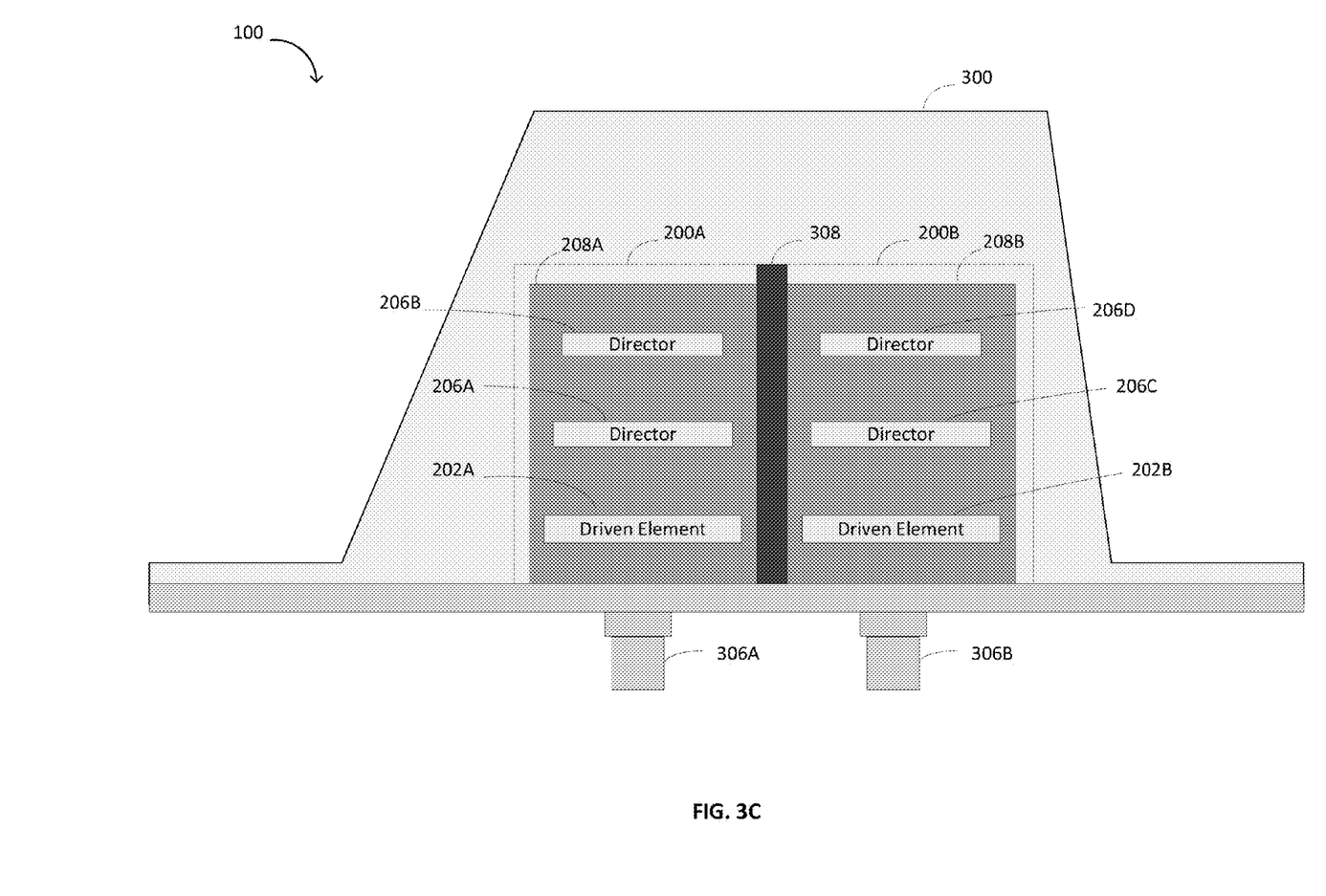
FIG. 3C conceptually illustrates an enclosure containing a driven element and at least one director element of a first (transmitting) antenna of the system and a driven element and at least one director element of a second (receiving) antenna of the system, in accordance with an embodiment of this disclosure.

In some embodiments, the system 100 further includes at least one enclosure 300 configured to contain at least a portion of each altimeter antenna 200, as illustrated in FIGS. 3A-3C. In some embodiments, each enclosure 300 is configured for aircraft implementation. For example, the enclosure 300 may have a blade-shaped form factor (e.g. L-band blade antenna form factor). The enclosure 300 may be further configured to withstand critical weather conditions, in-flight atmospheric conditions, and the like.

In some embodiments, illustrated in FIG. 3A, the driven element 202 and the one or more director elements 206 are disposed upon a printed circuit board 208 within the enclosure 300. In some embodiments, the enclosure 300 may include an outer shell 302 made of a durable plastic structure, such as an over-molded epoxy body, coupled to an aluminum base plate 304. The enclosure may further include at least one connection port 306 for communicatively coupling a driven element 202 of a transmitting or receiving antenna 200 with a respective transmitter 104 or receiver 106 of the altimeter 102.

In some embodiments, illustrated in FIG. 3B, a first enclosure 300A is configured to contain a first (transmitting) antenna 200A and a second enclosure 300B is configured to contain a second (receiving) antenna 200B. It may be undesirable for the second antenna 200B to detect portions of a signal 108A transmitted directly from the first antenna 200A because the transmit signal may overdrive the receiver associated with the second antenna 200B. Accordingly, the first enclosure 300A may be disposed a selected distance from the second enclosure 300B in order to provide the required level of isolation from the first antenna 200A to the second antenna 200B. In some embodiments, the altimeter 102 is further configured to at least partially cancel interference by executing a cancellation algorithm utilizing at least one processor.

In some embodiments, illustrated in FIG. 3C, one enclosure 300 is configured to contain both of the first antenna 200A and the second antenna 200B. Including both antennas 200 within a common enclosure may allow for a space saving design. The enclosure 300 may further include an absorber 302 disposed between the first antenna 200A and the second antenna 300B to prevent unwanted antenna coupling (as discussed above).

Figure 4A:
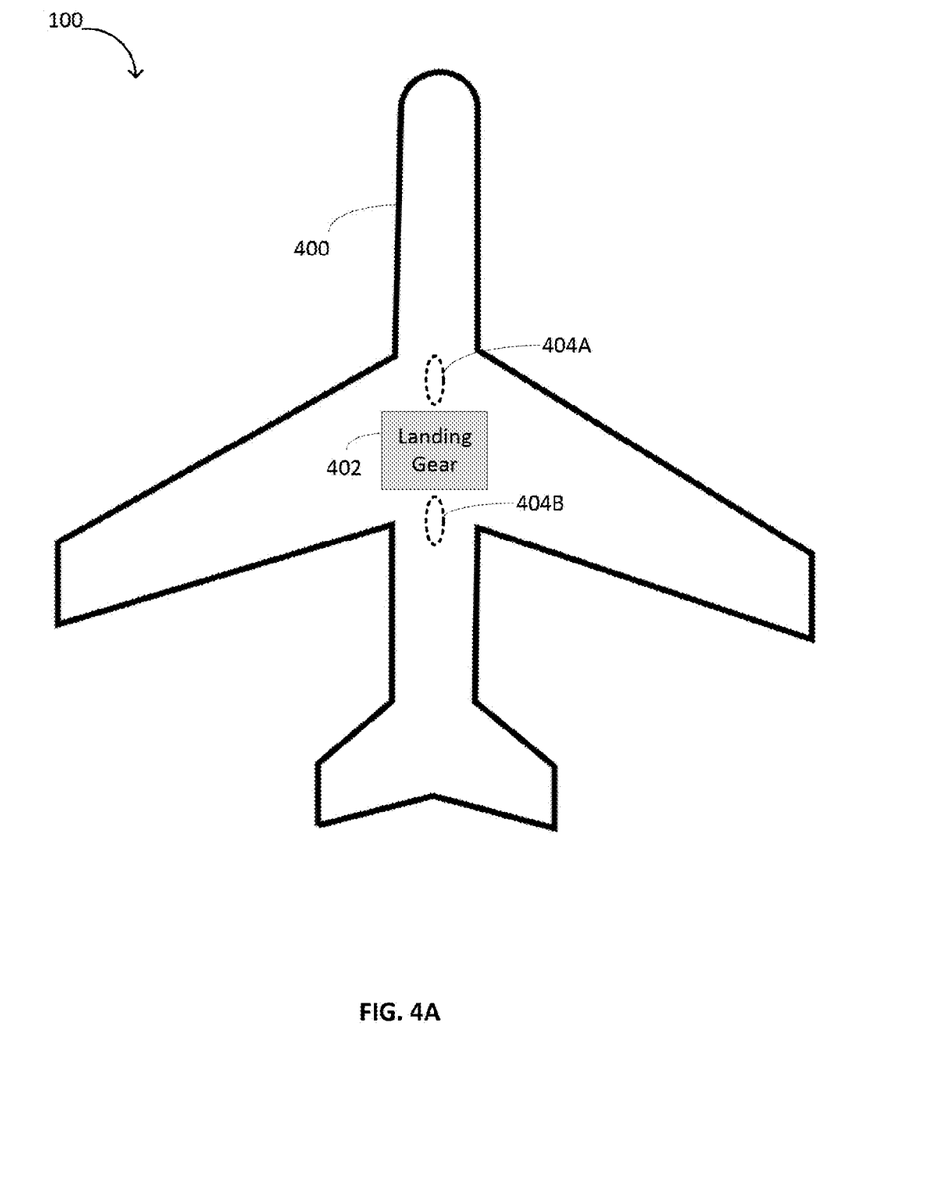
FIG. 4A conceptually illustrates a surface of an aircraft, wherein at least one enclosure is configured to be coupled to the surface of the aircraft, in accordance with an embodiment of this disclosure.
Figure 4B:
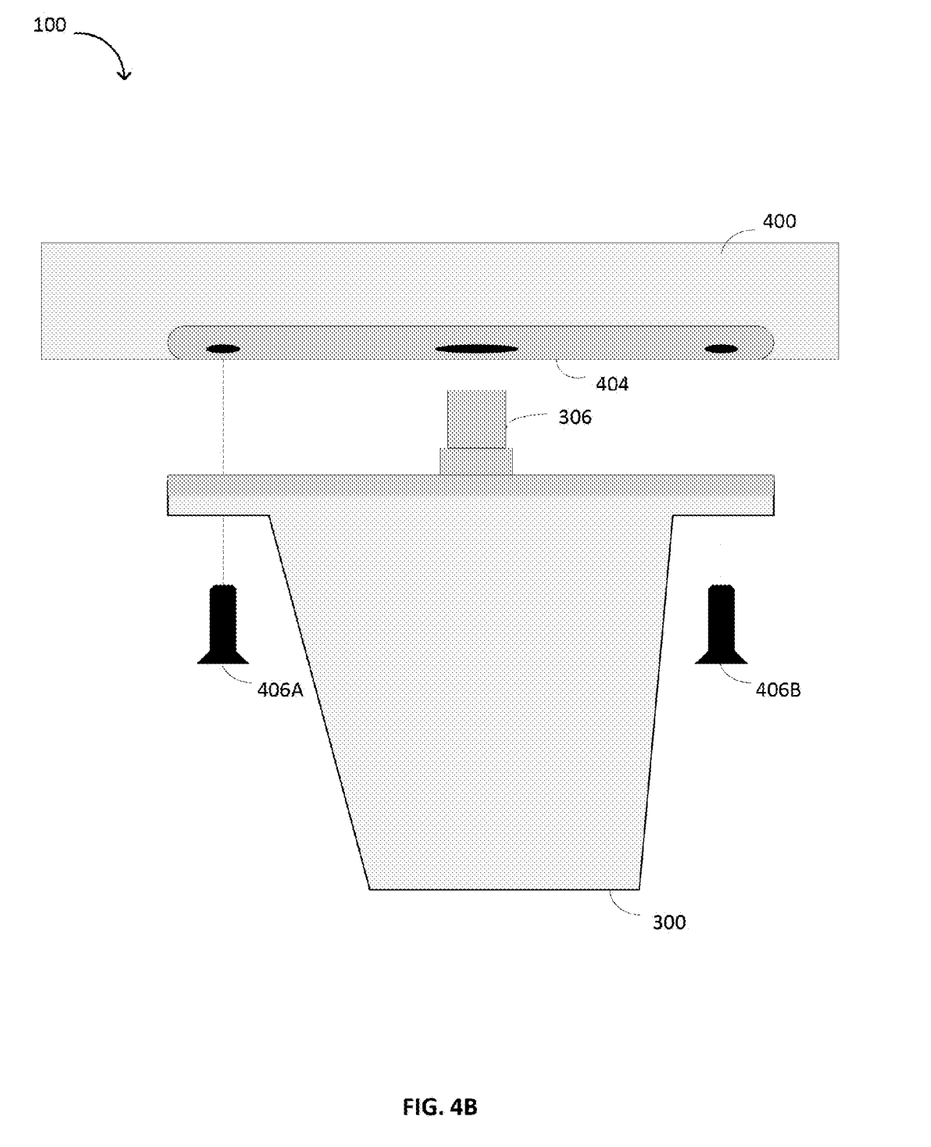
FIG. 4B conceptually illustrates a blade-shaped enclosure configured to be coupled to the surface of the aircraft, wherein the enclosure contains a driven element and at least one director element of an (transmitting or receiving) antenna, in accordance with an embodiment of this disclosure.
Figure 4C:
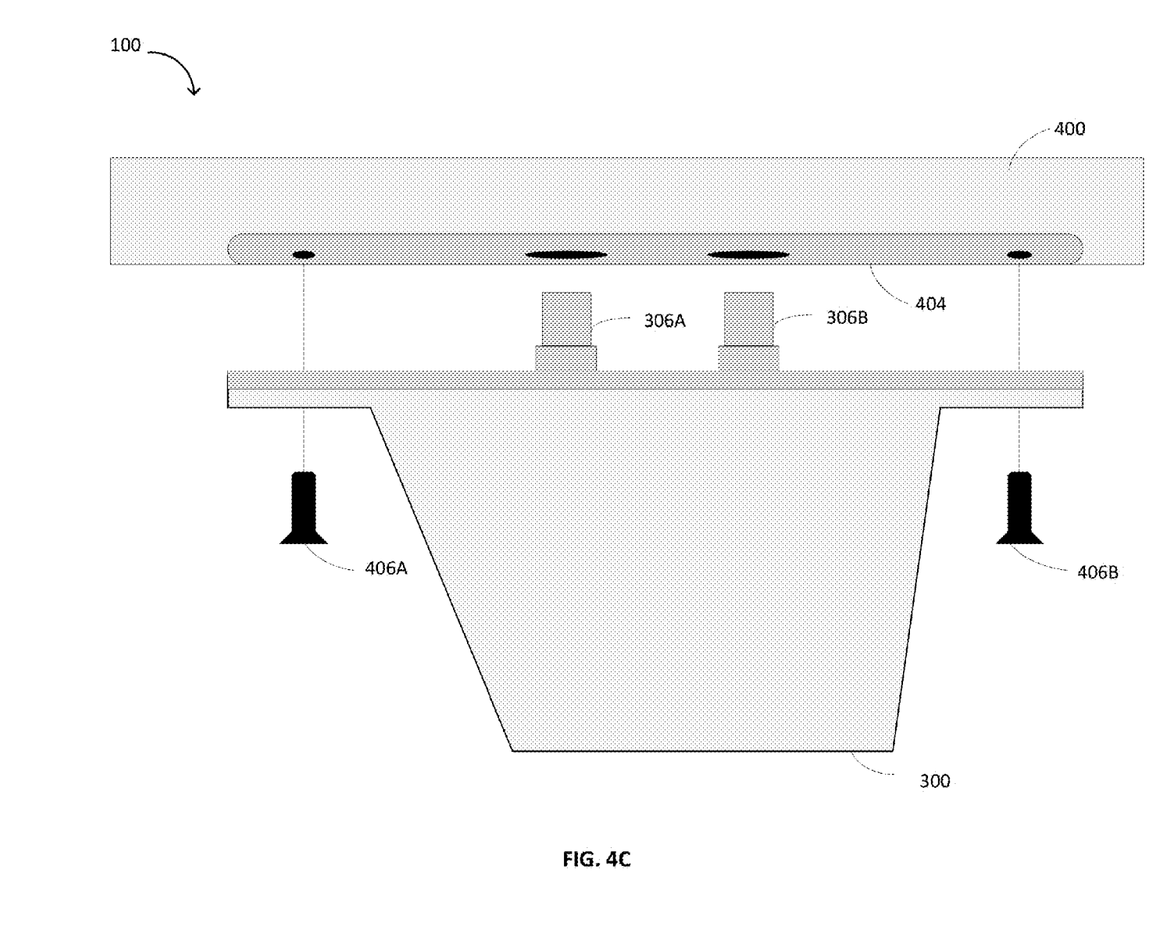
FIG. 4C conceptually illustrates a blade-shaped enclosure configured to be coupled to the surface of the aircraft, wherein the enclosure contains a driven element and at least one director element of a first (transmitting) antenna of the system and a driven element and at least one director element of a second (receiving) antenna; in accordance with an embodiment of this disclosure.

FIGS. 4A through 4C illustrate embodiments of the system 100, wherein the altimeter 102 is configured to determine altitude of one or more selected reference points of an aircraft 400. Portions of the altimeter 102 may be disposed upon or within the aircraft 400. For example, the user interface 112 may be disposed proximate to or integrated within an instrument cluster of the aircraft 400. One or more enclosures 300 including the transmitting and receiving antennas 200 may be disposed on an exterior surface of the aircraft 400, such as the underside of the aircraft fuselage. The Yagi-Uda array or similar topology of the antennas 200 may be less susceptible than other antenna topologies to heavy water flow along the underside of the aircraft fuselage. Accordingly, the antenna design described herein may allow for acceptable signal strength during critical weather conditions, including Category III C landing conditions.

In some embodiments, the one or more enclosures 300 may be disposed at one or more selected locations 404 of the aircraft fuselage surface. For example, the one or more enclosures 300 may be disposed proximate to a landing gear 402 of the aircraft 400. In some embodiments, a selected location 404 may include a location 404A in front of the landing gear 402 or a location 404B behind the landing gear 402. As illustrated in FIGS. 4B and 4C, the one or more enclosures 300 may be configured to attach to the one or more selected locations 404 utilizing fasteners 406 (e.g. screws or rivets). It is further contemplated that alternative enclosure form factors and coupling means may be employed. Accordingly, the foregoing embodiments are not intended as limitations of the present disclosure.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

What is claimed is:

1. An altimeter, comprising:
a transmitter coupled to a first antenna configured for transmitting a ranging signal to a surface, the first antenna including a driven element and at least one director element;
a receiver coupled to a second antenna configured for receiving at least a portion of the ranging signal reflected from the surface, the second antenna including a driven element and at least one director element;
a first enclosure containing the driven element and the at least one director element of the first antenna; and
a second enclosure containing the driven element and the at least one director element of the second antenna;
wherein the first enclosure and the second enclosure are configured to withstand critical weather conditions.

2. The altimeter of claim 1, wherein each of the first antenna and the second antenna comprises a Yagi-Uda array.

3. The altimeter of claim 1, wherein each of the first enclosure and the second enclosure comprises a blade shaped enclosure.

4. The altimeter of claim 1, wherein each of the first enclosure and the second enclosure is coupled to a surface of an aircraft.

5. The altimeter of claim 4, wherein each of the first antenna and the second antenna includes a reflector element comprising at least a portion of the surface of the aircraft.

6. The altimeter of claim 1, further comprising:
a first printed circuit board configured to support the driven element and the at least one director element of the first antenna; and
a second printed circuit board configured to support the driven element and the at least one director element of the second antenna.

7. An altimeter, comprising:
a transmitter coupled to a first antenna configured for transmitting a ranging signal to a surface, the first antenna including a driven element and at least one director element;
a receiver coupled to a second antenna configured for receiving at least a portion of the ranging signal reflected from the surface, the second antenna including a driven element and at least one director element; and
an enclosure containing the driven element and the at least one director element of the first antenna and the driven element and the at least one director element of the second antenna;
wherein the enclosure is configured to withstand critical weather conditions.

8. The altimeter of claim 7, wherein each of the first antenna and the second antenna comprises a Yagi-Uda array.

9. The altimeter of claim 7, wherein the enclosure comprises a blade shaped enclosure.

10. The altimeter of claim 7, wherein the enclosure is coupled to a surface of an aircraft.

11. The altimeter of claim 10, wherein each of the first antenna and the second antenna includes a reflector element comprising at least a portion of the surface of the aircraft.

12. The altimeter of claim 7, further comprising:
one or more printed circuit boards configured to support the driven element and the at least one director element of the first antenna and the driven element and the at least one director element of the second antenna.

13. The altimeter of claim 7, further comprising:
an absorber disposed between the driven element of the first antenna and the driven element of the second antenna within the enclosure, the absorber configured to prevent the first antenna from interfering with the second antenna.

14. A system for determining aircraft altitude, comprising:
an aircraft;
an altimeter including a transmitter coupled to a first antenna configured for transmitting a ranging signal to a surface and a receiver coupled to a second antenna configured for receiving at least a portion of the ranging signal reflected from the surface, the first antenna and the second antenna each including a driven element and at least one director element; and
at least one enclosure coupled to a surface of the aircraft, the at least one enclosure containing at least one of the first antenna and the second antenna;
wherein the at least one enclosure is configured to withstand critical weather conditions.

15. The system of claim 14, wherein each of the first antenna and the second antenna comprises a Yagi-Uda array.

16. The system of claim 14, wherein each of the first antenna and the second antenna includes a reflector element comprising at least a portion of the surface of the aircraft.

17. The system of claim 14, wherein the at least one enclosure comprises a blade-shaped enclosure.

18. The system of claim 14, wherein the at least one enclosure comprises:
a first enclosure containing the driven element and the at least one director element of the first antenna; and
a second enclosure containing the driven element and the at least one director element of the second antenna.

19. The system of claim 14, wherein the at least one enclosure comprises:
an enclosure containing the driven element and the at least one director element of the first antenna and the driven element and the at least one director element of the second antenna; and
an absorber disposed between the driven element of the first antenna and the driven element of the second antenna within the enclosure, the absorber configured to prevent the first antenna from interfering with the second antenna.

20. The system of claim 14, further comprising:
one or more printed circuit boards configured to support the driven element and the at least one director element of the first antenna and the driven element and the at least one director element of the second antenna.

* * * * *